(12) United States Patent
Draper et al.

(10) Patent No.: US 11,459,701 B2
(45) Date of Patent: Oct. 4, 2022

(54) WEAR COMPOSITES INCLUDING ONE OR MORE METAL LAYERS

(71) Applicant: Kadant Inc., Westford, MA (US)

(72) Inventors: Michael Draper, Lancashire (GB); Royal Gauvin, Windham, ME (US)

(73) Assignee: Kadant Inc., Westford, MA (US)

( * ) Notice: Subject to any disclaimer, the term of this patent is extended or adjusted under 35 U.S.C. 154(b) by 0 days.

(21) Appl. No.: 16/368,167

(22) Filed: Mar. 28, 2019

(65) Prior Publication Data

US 2019/0301098 A1 Oct. 3, 2019

Related U.S. Application Data

(60) Provisional application No. 62/649,027, filed on Mar. 28, 2018.

(51) Int. Cl.
| | |
|---|---|
| *D21G 3/00* | (2006.01) |
| *B08B 1/00* | (2006.01) |
| *B32B 5/02* | (2006.01) |
| *B32B 5/26* | (2006.01) |
| *B32B 15/00* | (2006.01) |
| *B32B 15/02* | (2006.01) |
| *B32B 15/04* | (2006.01) |
| *B32B 15/14* | (2006.01) |
| *B32B 15/18* | (2006.01) |
| *B32B 5/24* | (2006.01) |

(52) U.S. Cl.
CPC ............. *D21G 3/005* (2013.01); *B08B 1/005* (2013.01); *B32B 5/024* (2013.01); *B32B 5/028* (2013.01); *B32B 5/245* (2013.01); *B32B 5/26* (2013.01); *B32B 2262/101* (2013.01); *B32B 2262/103* (2013.01); *B32B 2262/106* (2013.01); *B32B 2266/045* (2013.01); *B32B 2432/00* (2013.01)

(58) Field of Classification Search
CPC .......... D21G 3/005; B08B 1/00; B32B 5/028; B32B 5/26; B32B 2262/106; B21B 2262/101
See application file for complete search history.

(56) References Cited

U.S. PATENT DOCUMENTS

| | | | |
|---|---|---|---|
| 4,549,933 A | 10/1985 | Judd et al. | |
| 4,888,247 A | 12/1989 | Zweben et al. | |
| 5,088,170 A * | 2/1992 | Spath | B21D 31/046 29/6.1 |
| 5,227,216 A | 7/1993 | Pettit | |

(Continued)

FOREIGN PATENT DOCUMENTS

| | | |
|---|---|---|
| EP | 1683914 A1 | 7/2006 |
| TW | 201318837 A | 5/2013 |

OTHER PUBLICATIONS

International Search Report & Written Opinion issued by International Searching Authority in related International Patent Application No. PCT/US2019/024606 dated May 15, 2019, 11 pgs.

(Continued)

*Primary Examiner* — Joanna Pleszczynska
(74) *Attorney, Agent, or Firm* — Gesmer Updegrove LLP

(57) ABSTRACT

A wear element is disclosed that includes at least two layers of a structural material and at least one layer of a non-solid metal material, wherein the non-solid metal material includes a non-homogenous edge for contacting a roll surface.

29 Claims, 13 Drawing Sheets

(56) References Cited

U.S. PATENT DOCUMENTS

| | | | |
|---|---|---|---|
| 6,687,950 B1* | 2/2004 | Rata .................. | D21G 3/005 |
| | | | 15/256.51 |
| 9,551,109 B2 | 1/2017 | Draper et al. | |
| 2014/0106113 A1* | 4/2014 | Miettinen ............. | D21G 3/005 |
| | | | 428/113 |

OTHER PUBLICATIONS

Communication pursuant to Rules 161(1) and 162EPC issued by the European Patent Office in related European Patent Application No. 19717087.1 dated Nov. 4, 2020, 3 pages.

International Preliminary Report on Patentability issued by the International Bureau of WIPO in related International Application No. PCT/US2019/024606 dated Sep. 29, 2020, 7 pages.

Notice on the First Office Action, Search Report and First Office Action, along with its English translation, issued by the China National Intellectual Property Administration in related Chinese Patent Application No. 201980022755.2 dated Apr. 24, 2022, 22 pages.

\* cited by examiner

WEAR COMPOSITES INCLUDING ONE OR MORE METAL LAYERS

PRIORITY

The present application claims priority to U.S. Provisional Patent Application Ser. No. 62/649,027 filed Mar. 28, 2018, the disclosure of which is hereby incorporated by reference in its entirety.

BACKGROUND

The present invention relates generally to composite doctor blades used in papermaking, web converting and other industrial process industries.

Composite doctor blades contact the surface of rolls in papermaking, web converting and process industry machines for the purpose of cleaning or sheet removal. Conventional composite doctor blade materials usually include reinforcement fabrics comprising glass, carbon, cotton, or aramid fibers in a thermoset or thermoplastic resin matrix. For example, composite doctor blades are traditionally comprised of fabric substrates held together by polymeric resins, with the combination of substrate and resin providing the desired properties for efficient doctoring. Thermoset resins, e.g., epoxy resins, tend to be harder wearing, whilst high performance thermoplastic resins, such as polyphenylene sulphide (PPS) tend to be able to withstand higher machine temperatures and are less susceptible to chemical attack. A bevel edge is machined into the polymer composite to produce an angled slant at the tip of the blade to aid roll cleaning or sheet removal. The sharper and cleaner this edge is, the more efficient the performance of the doctor blade.

Doctor blades made from different materials are known. See, for example, U.S. Pat. No. 4,549,933, which describes a doctor blade for a paper machine consisting of a number of layers of synthetic fibrous material and carbon fiber with the synthetic fibrous layers consisting of cotton, paper, fiberglass, or equivalents thereof.

In traditional fiber-reinforced composite doctor blades, the fibers are comprised of cotton, glass, or carbon fibers. These fibers are grouped into fiber bundles and then woven with half the fibers in the direction parallel to the paper machine (cross machine direction) and half in the direction perpendicular to the paper machine (machine direction). The majority of woven fabrics have the same material in both directions. These fabrics are then impregnated with resin, and a number of pre-pregged fabrics are stacked up and subsequently compression molded to form the doctor blade. The different types of fibers provide different advantages and disadvantages for doctor blades. Carbon fibers, while expensive, provide excellent wear resistance and high strength if the fibers are placed in one direction. Glass fibers can provide very good cleaning of roll surfaces. Cotton fibers will provide acceptable performance in some applications at economical cost.

There remains a need however, for wear components in a papermaking system such as doctor blades, to provide improved wear resistance yet efficient processing of the roll surface.

SUMMARY

In accordance with an embodiment, the invention provides a wear element for contacting a roll surface in a papermaking machine. The wear element includes at least two layers of a structural material and at least one layer of a non-solid metal material, wherein the non-solid metal material includes a leading edge for contacting the roll surface.

In accordance with another embodiment, the invention provides a wear element for contacting a roll surface in a papermaking machine, and the wear element includes at least two layers of a structural material and at least one layer of a flexible metal material, wherein the flexible metal material includes a wearable edge for contacting the roll surface.

In accordance with a further embodiment, the invention provides a method of cleaning a roll surface in a papermaking system. The method includes the steps of providing a doctor blade that includes at least two layers of a structural material and at least one layer of a non-solid metal material, wherein the non-solid metal material includes a non-homogenous edge for contacting the roll, and applying the doctor blade against the roll surface in the papermaking machine.

BRIEF DESCRIPTION OF THE DRAWINGS

The following description may be further understood with reference to the accompanying drawings in which.

The drawings are shown for illustrative purposes only.

DETAILED DESCRIPTION

The present invention provides a novel composite wear component such as a doctor blade, made from fiber-reinforced composite with the incorporation of a metal mesh for improved cleaning. The invention may also include nanoparticles in the resin for both thermoplastic and thermoset resins, particularly spherical silica nano particles and multi-walled carbon nanotubes. There is a particular need in the industry for an aggressive cleaning composite blade capable of operating and surviving on the heavily contaminated, and hence problematic, early dryers of many paper machines using recycled fiber as a raw material. This invention addresses this need and provides a solution to this industry problem.

Figure 1:
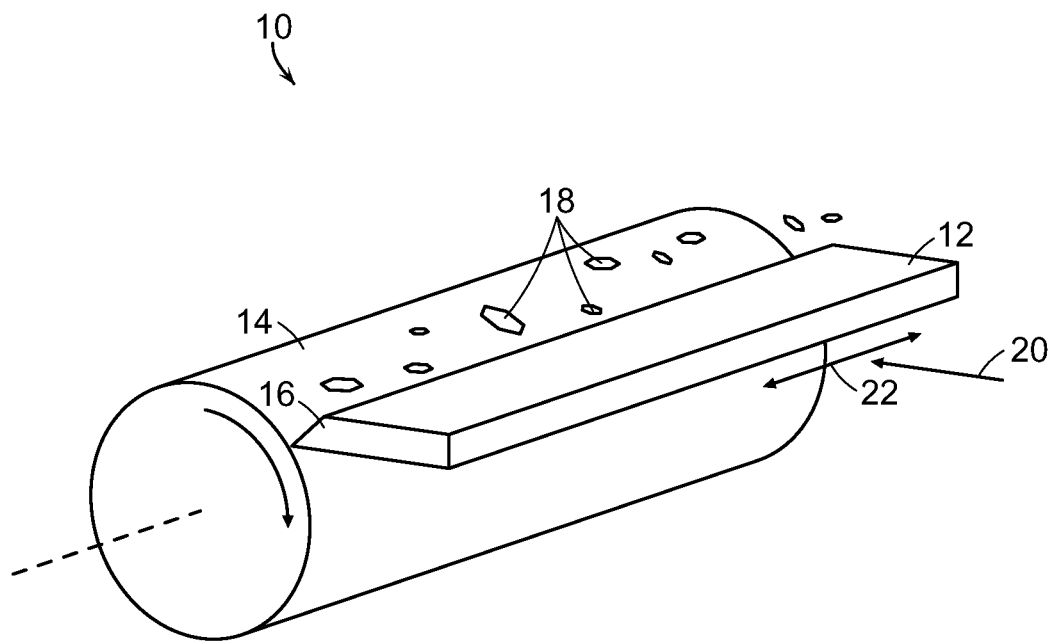
FIG. 1 shows an illustrative diagrammatic view of a system in accordance with an embodiment of the present invention.
Figure 2:
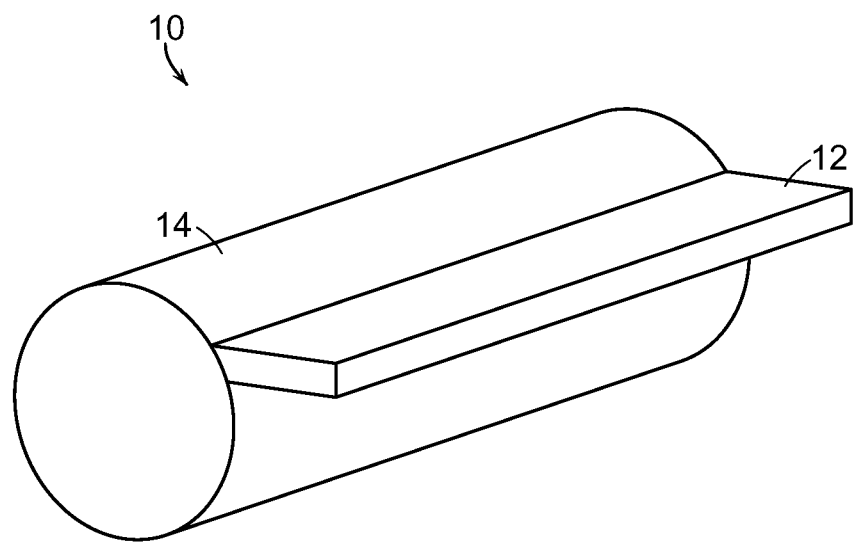
FIG. 2 shows an illustrative diagrammatic view of the system of FIG. 1 following wear of the wear element of FIG. 1.

FIG. 1, for example, shows a system 10 that includes a doctor blade 12 for cleaning a roll 14, where a wear edge 16 of the doctor blade 12 is used to remove material 18 that may be stuck on the roll 14. The doctor blade 12 may, over time, be advanced in the machine direction as shown at 20, and during cleaning, the doctor blade 12 may be oscillated in the cross-machine direction as shown at 22. With reference to FIG. 2, the doctor blade 12 will wear, and eventually bed into the roll 14.

Figure 3:
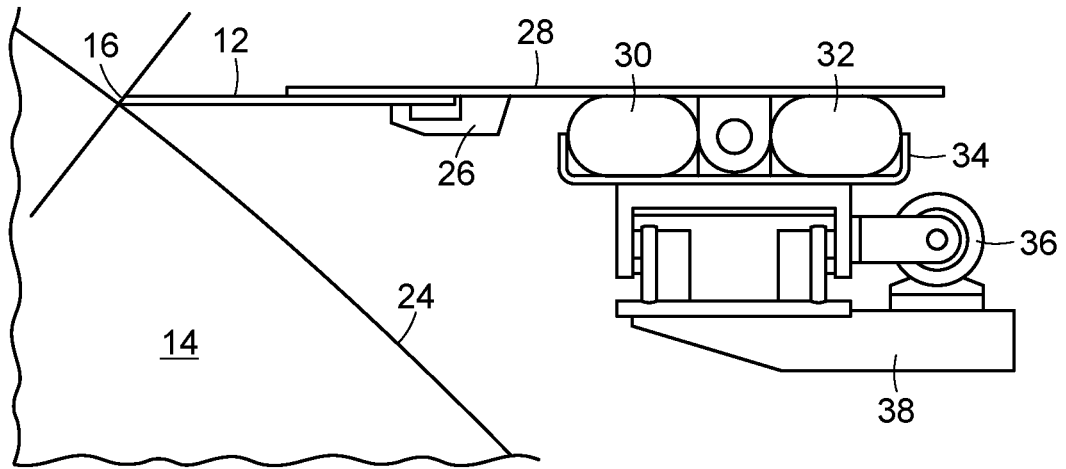
FIG. 3 shows an illustrative diagrammatic side view of a system of FIG. 1 in a doctor blade holder system.
Figure 4:
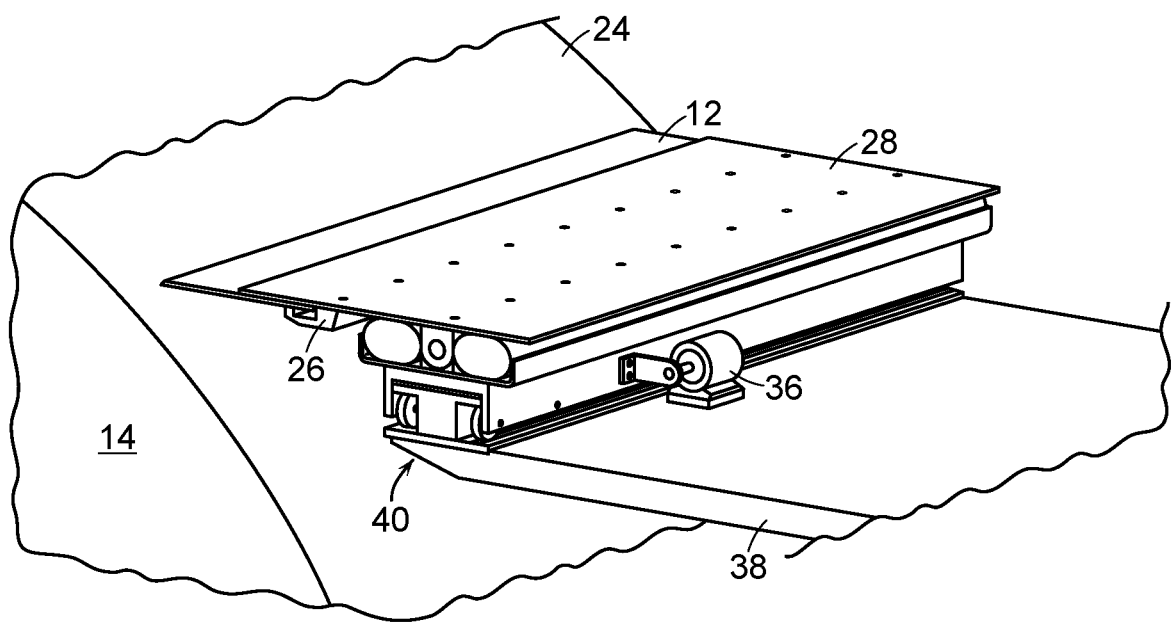
FIG. 4 shows an illustrative diagrammatic isometric view of the system of FIG. 3 further showing an oscillation device.

With further reference to FIGS. 3 and 4, the original bevelled edge 16 of the doctor blade 12 may be applied to the surface 24 of the roll 14 at desired angle (e.g., normal to the surface), but will wear with use. The doctor blade 12 may be held in a doctor blade holder 26 that includes a top plate 28, and the top plate 28 may be position adjustable by loading and unloading tubes 30, 32 in a tube tray 34. The tube tray 34 may be mounted on an oscillator 40 that includes an oscillation motor 36, and the oscillator 40 may be mounted on a doctor back 38.

In other industries, metal layers have previously been incorporated into fiber reinforced polymer matrix composites to provide heat conducting laminates and to act as heat sinks and heat dissipating plates in heat transfer devices and electronic components, e.g. in printed wiring boards in the field of electronics, and to control the coefficient of thermal expansion. See for example, U.S. Pat. No. 4,888,247, which discloses heat conducting laminates that include at least one layer of a metal, and at least one layer of thermoset polymer matrix composite material having low-thermal expansion reinforcing material embedded therein. Metal layers have also been used to improve fatigue resistance in aircraft fuselages, caused by repeated pressurization and de-pressurization of the cabin during take-off and landing. See, for example, U.S. Pat. No. 5,227,216, which discloses a fiber/metal laminate composite material that includes a plurality of metallic layers (each 10 to 20 mils thick), reinforced with a plurality of fiber layers, where the metal layers comprise 40% to 70% of the total laminate volume.

In accordance with various embodiments, the invention provide the incorporation of a metal layer into a doctor blade to provide enhanced roll cleaning. Traditional doctor blades are made by combining several individual layers of reinforcement fabric together with a polymeric resin. Heat and pressure are used to cure the polymeric resin and chemically bond the individual reinforcement layers together. The reinforcement fabrics used are typically glass, carbon or combinations of both. Glass fabrics impart the doctor blades with cleaning and abrasive properties, whilst carbon reinforcement is used to improve the wear life of the doctor blade. Different combinations of both are used depending on the property and performance requirement of a particular doctor blade. For example, eight layers of 200 grams per square meter (gsm) plain weave glass may be bonded together to produce a doctor blade of thickness 1.5 mm. Fabric reinforcement containing aramid fibers may also be included to impart the doctor blades with increased impact resistance. Micron sized fillers may also be used to further reinforce the resin and give the blades additional property enhancements, e.g., silicon carbide and aluminum oxide may be used to give the doctor blades additional abrasive properties.

Figure 5:
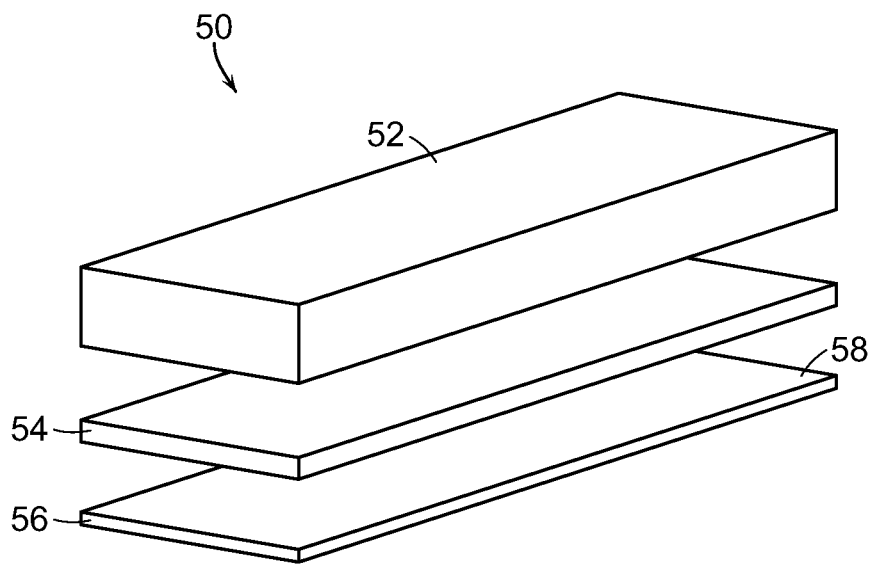
FIG. 5 shows an illustrative diagrammatic isometric exploded view of a doctor blade in accordance with an embodiment of the invention.

FIG. 5, for example, shows a wear component 50 in accordance with an embodiment of the present invention, that includes a metal layer 54 sandwiched between a top layer 52 and a bottom layer 56. The inward facing side of the bottom layer 56 may include a resin 58, and the inward facing side of the top layer 52 may also include a resin. The top layer 52 may include one or more layers of combinations of glass fibers, carbon fibers and aramid fibers, and the bottom layer 56 may, for example, be formed of glass fibers. The resin 58 assists in laminating the layers of glass fibers together, and where the metal layer 54 includes openings, the resin penetrates the openings to further adhere the laminate 50.

Figure 6:
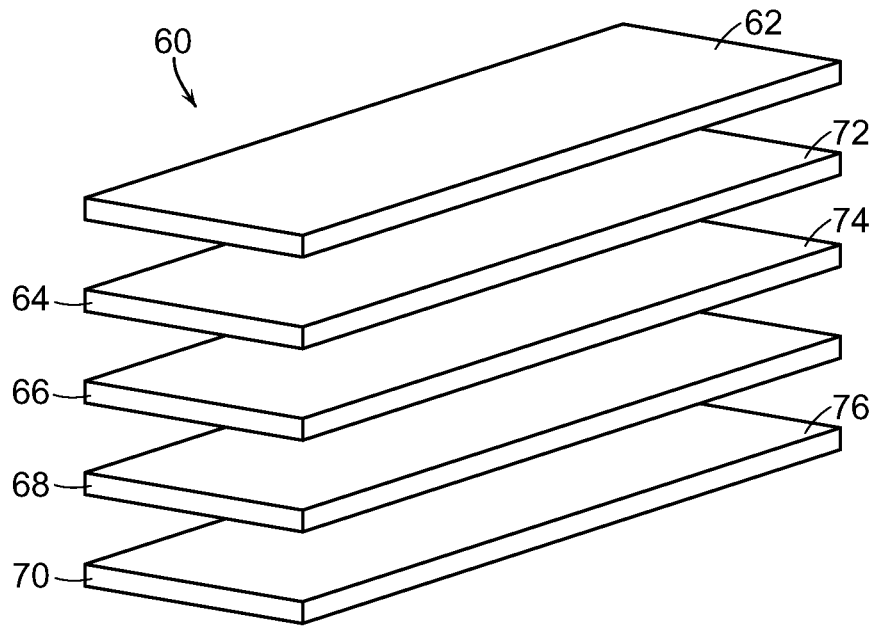
FIG. 6 shows an illustrative diagrammatic isometric exploded view of a doctor blade in accordance with another embodiment of the invention.
Figure 7:
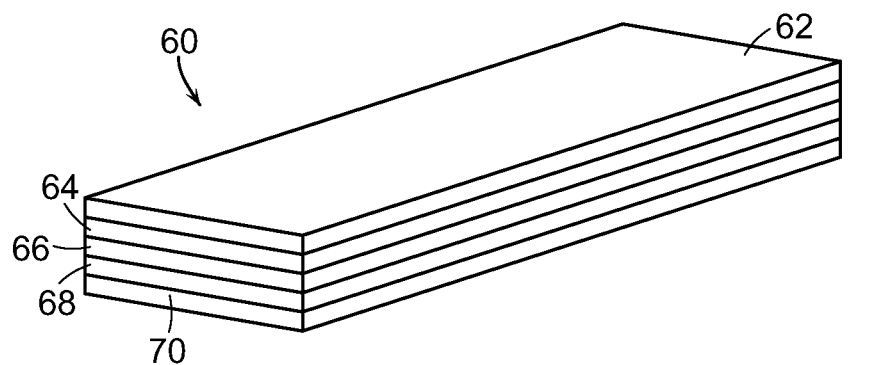
FIG. 7 shows an illustrative diagrammatic isometric view of a doctor blade in accordance with a further embodiment of the present invention.

FIG. 6, for example, shows a wear component 60 that includes a glass fiber top layer 62, a carbon fiber layer 64, a combined carbon and glass fiber layer 66, a metal layer 68, and a glass fiber layer 70. Again, the inward facing sides of the layers 62, 64, 66 and 70 include a resin 72, 74, 76 that assists in laminating the layers of fibers together, and where the metal layer 68 includes openings, the resin penetrates the openings to further adhere the laminate 60. FIG. 7 shows the wear component 60 laminated together. In accordance with various embodiments, the wear component 60 may include a plurality of metal layers, either adjacent or with alternating fiber layers.

In accordance with an embodiment, the invention includes the incorporation of a thin metal mesh or foil as one or more of the layers in the fiber-reinforced composite. The mesh may be made of any metal, such as stainless steel, copper, or alloys. The position of the metal mesh layer in the composite was also found to be very important. The mesh is preferably positioned towards the bottom of the composite, closer to the roller surface. In this position the metal layer makes early contact with the roll and starts to have an immediate impact on the cleanliness of the drum. Any type of metal mesh could be used, but expanded metal foil microgrids were found to be particularly beneficial, due to the ability of their open structure to create an aggressive cleaning edge. The open structure has the synergistic benefit of allowing the resin to be able to penetrate through the open structure, encapsulate the metal strands and by so doing form a better inter-layer bond, thus improving the integrity of the resultant composite and enabling it to better withstand impact damage from stuck material and other hard roll contaminants.

Figure 8:
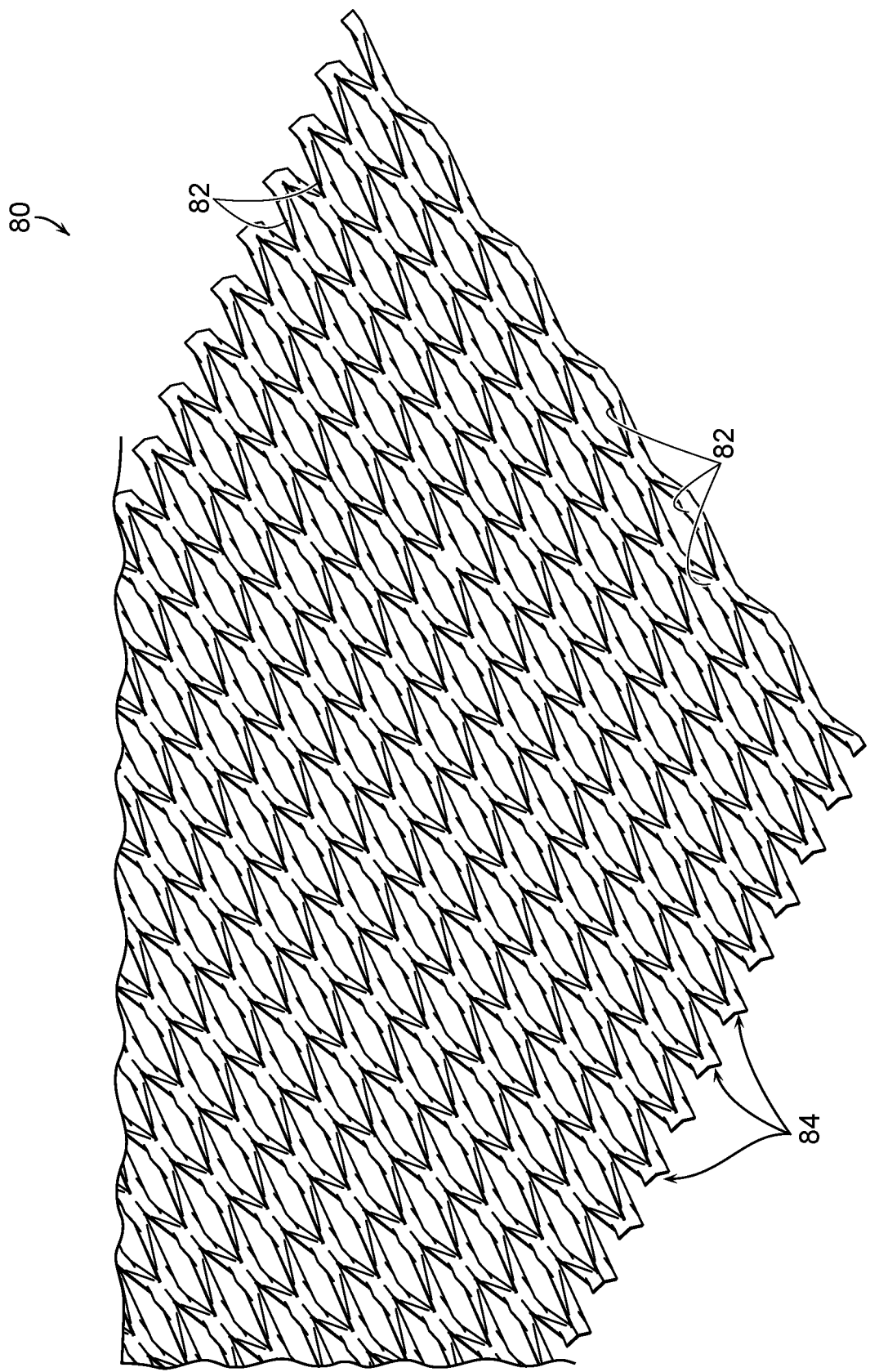
FIG. 8 shows an illustrative diagrammatic isometric view of a doctor blade including an expanded metal foil in accordance with an embodiment of the present invention.

FIG. 8 shows an expanded metal foil 80 for use as a metal layer in a wear component in accordance with an embodiment of the present invention. The expanded metal foil 80 may be formed, for example, by providing small slits in the foil, and then pulling the foil to expand the slits, forming roughly diamond shaped openings 82. An irregular edge 84 of the layer may form part of the leading edge 16 in the composite doctor blade 12.

Expanded metal foils will not fray or unravel and readily conform to complex surfaces, making them well suited to typical composite manufacturing processes. Expanded metal foils are formed from solid metal foil by a slit and stretch process whereby the material is simultaneously slit and stretched by shaped tools which determine the form and number of openings. Strand dimensions (width and thickness), overall thickness of the foil and weight per square inch are all controllable variables. The resulting materials are thin, strong, flexible and lightweight. An embodiment of the invention therefore, involves the incorporation of such metal foil meshes in a composite doctor blade; the metal mesh provides an aggressive cleaning medium within the structure of the composite doctor blade.

Figure 9:
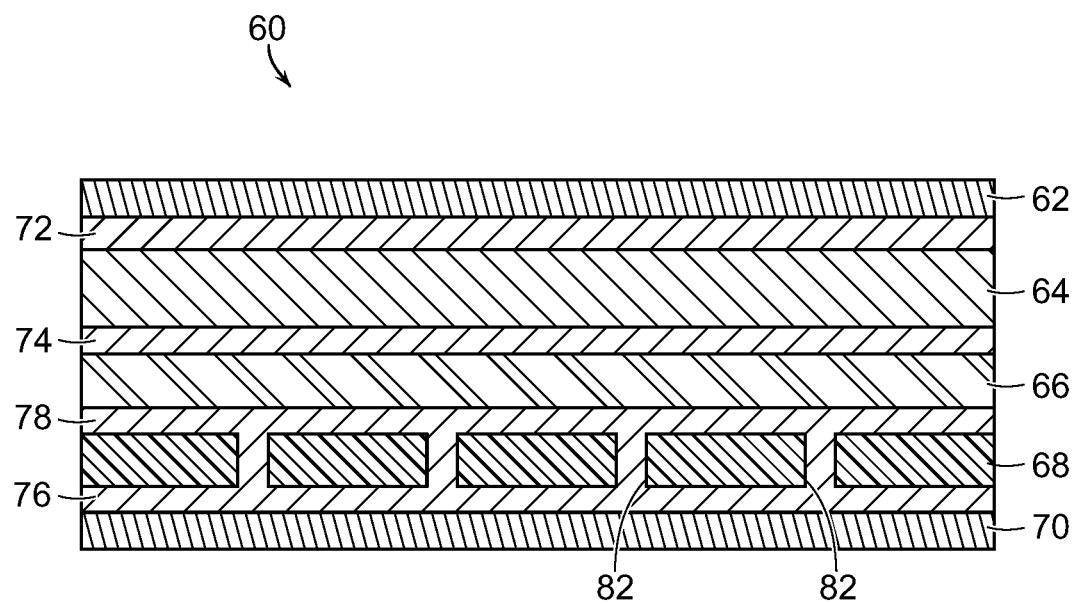
FIG. 9 shows an illustrative diagrammatic sectional view of a doctor blade including the expanded metal foil of FIG. 8.
Figure 10:
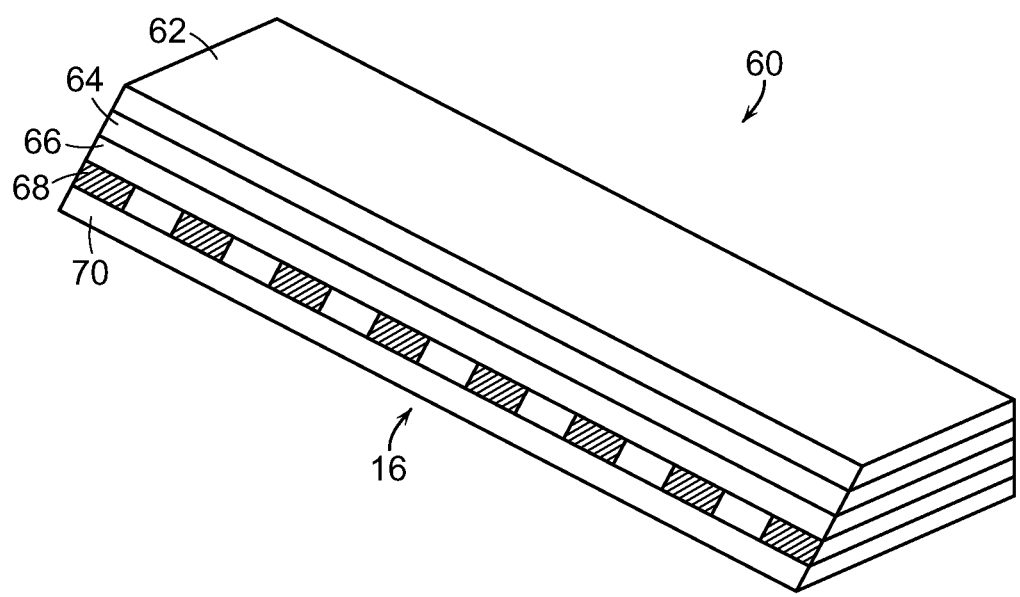
FIG. 10 shows an illustrative diagrammatic isometric view of a doctor blade including the expanded metal foil of FIG. 8.

The compatibility of metal meshes with composite structures and the fact that the open area of the expanded mesh can be precision-tailored to particular weight and dimensions, including their thickness, size of openings and the number of openings per unit area makes them an ideal component for a unique, high performance composite doctor blade. FIG. 9 shows a cross-sectional view of the wear component 60, including the glass fiber top layer 62, carbon fiber layer 64, combined carbon and glass fiber layer 66, metal layer 68, and glass fiber layer 70. As shown, the resin 72, 74, 76 and 78 (on the underside of the layer 66), flows through the openings 82 in the metal layer 68. FIG. 10 shows the formed doctor blade with portions of the metal layer 68 exposed at the beveled edge 16

The thickness of the strands on the foil or mesh may vary from about 0.001 inches to about 0.030 inches (0.03 mm to 0.76 mm). Any metal may be used in accordance with various embodiments, including Aluminum, Copper, Nickel, Stainless Steel (e.g., Stainless Steel 430 grade), Silver, Titanium, Iron, Tin, Zirconium, Beryllium, Magnesium, Lead, Biobium, Kanthal, Carbon steel, Zinc, Brass, Gold, Inconel, Phosphor Bronze, together with a variety of custom alloys, and particular metal(s) may be chosen to provide an optimal combination of toughness, stiffness, cleaning ability and interlayer bonding to make a viable composite doctor blade.

The metal layer is, in fact, non-solid (having openings), and non-rigid (very flexible) in various embodiments. The flexibility of the material, for example, may be on the order of the flexibility any of the glass fiber layers, the carbon fiber layers or the aramid fiber layers prior to lamination. Each of the materials (including the metal layer) is therefore, non-rigid prior to lamination. Further, the metal layer by itself may have a Young's Modulus of up to about 250 GPa (Giga Pascals), and may preferably be between about 100 GPa and 225 GPa. The metal layer, therefore, by itself is both made of strong material yet is pliable.

The invention involves in accordance with certain embodiments, the incorporation of one or more metal foils or meshes into a composite doctor blade. The incorporation of metal foil, for example, provides improved cleaning, as fibers in a composite doctor blade are relatively weak and cannot clean a roll surface as well as metal. The metal could also be incorporated through the use of metal fibers or filaments. The additional incorporation of nanoparticles will help to promote extended blade life for the blade, as disclosed for example, in U.S. Pat. No. 9,551,109, the disclosure of which is hereby incorporated by reference in its entirety.

The composite part of the blade may include glass, carbon, ceramic, aramid, metallic, inorganic, organic, high performance thermoplastic, synthetic, and modified synthetic fibers. The fibers may also be combined within a fiber bundle to include two or more different types of fibers. The resin may be made with a thermoset or thermoplastic resin system. Nanoparticles, either metallic or non-metallic, may also be included in various forms (e.g. powders, grains, fibers, and platelets) and may be included in the resin system.

The metal layer may be a foil or mesh or woven material that provides little to no structural support to the wear component, and is designed to wear with the glass fibers, carbon fibers and/or aramid fibers of the wear component. The metal layer is very flexible, having a thickness of only about 0.0005 inches to about 0.050 inches, with part of the thickness, in certain embodiments, owing to the metal being deformed (processed) such that portions of the layer extend in the thickness direction. Expanded metal foil, for example, may cause such z-direction variations as the metal foil deforms. Such z-direction deformations further secure the adhesion of the laminated wear component.

Figure 11:
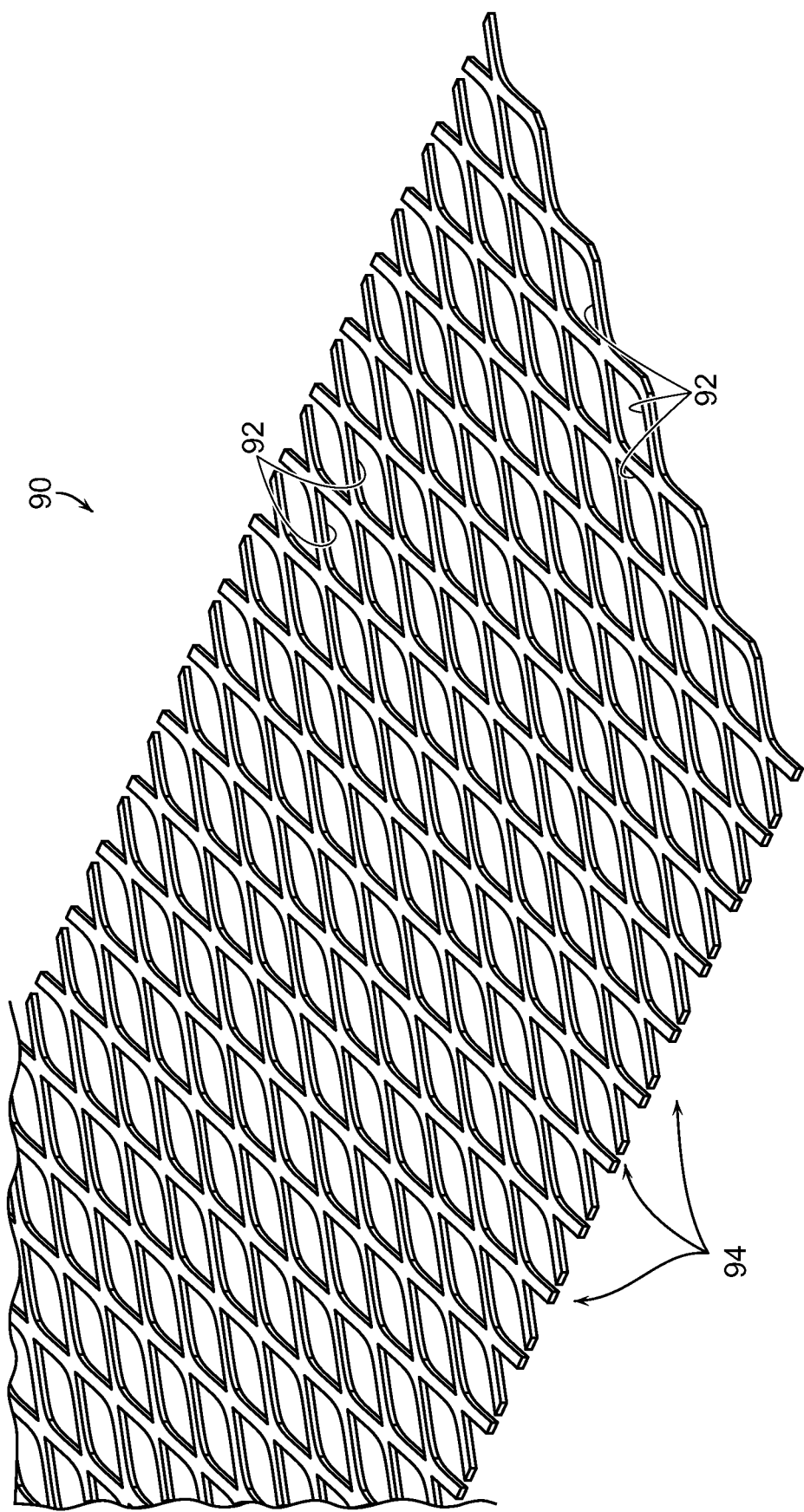
FIG. 11 shows an illustrative diagrammatic isometric view of a doctor blade including a stamped lattice metal material in accordance with an embodiment of the present invention.
Figure 12:
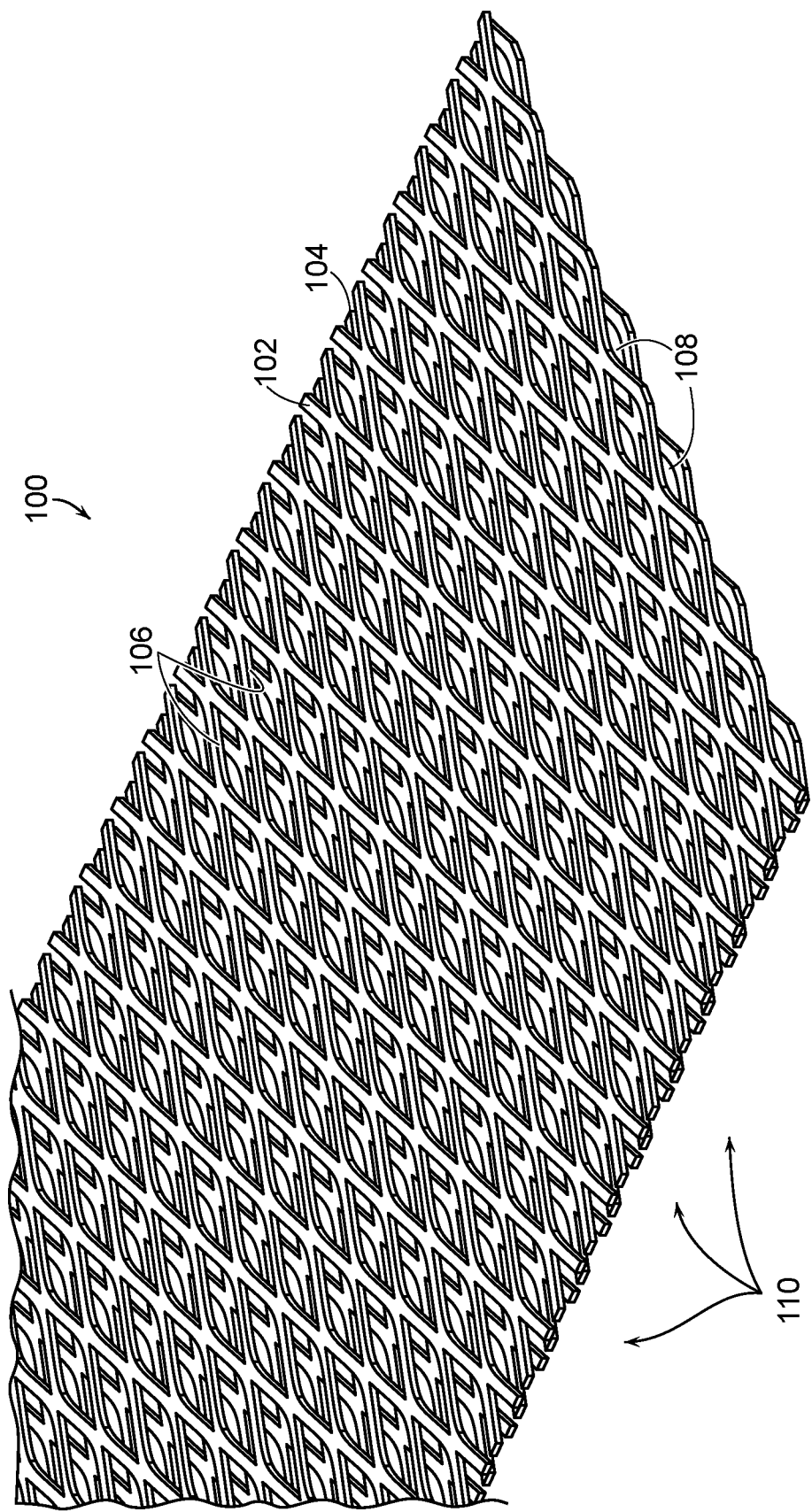
FIG. 12 shows an illustrative diagrammatic isometric view of a doctor blade including a plurality of layers of the stamped lattice metal material of FIG. 11 in accordance with an embodiment of the present invention.
Figure 13A:
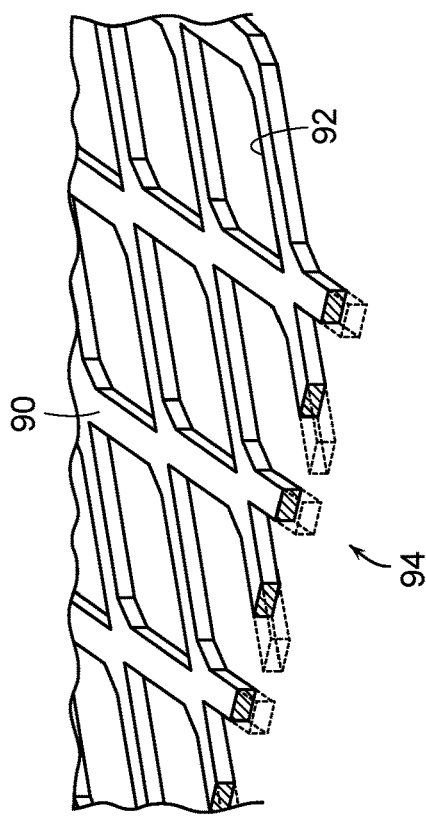
FIG. 13A-13D show illustrative diagrammatic isometric views of the stamped lattice metal material of FIG. 11 at different stages of wear.
Figure 13B:
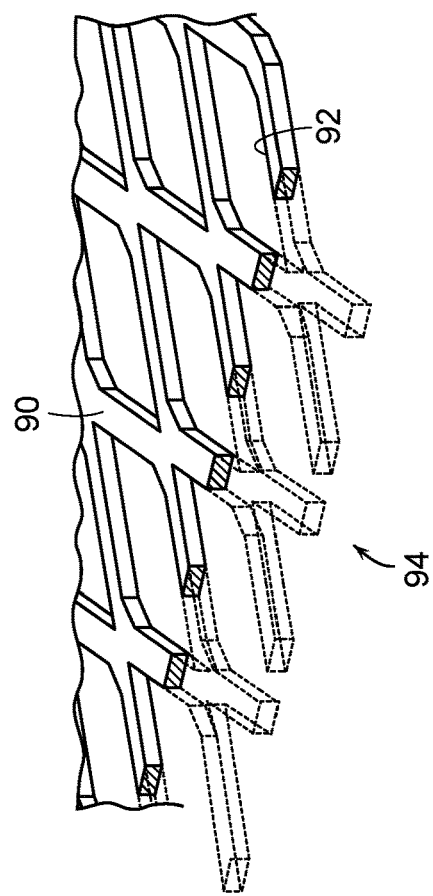
Figure 13C:
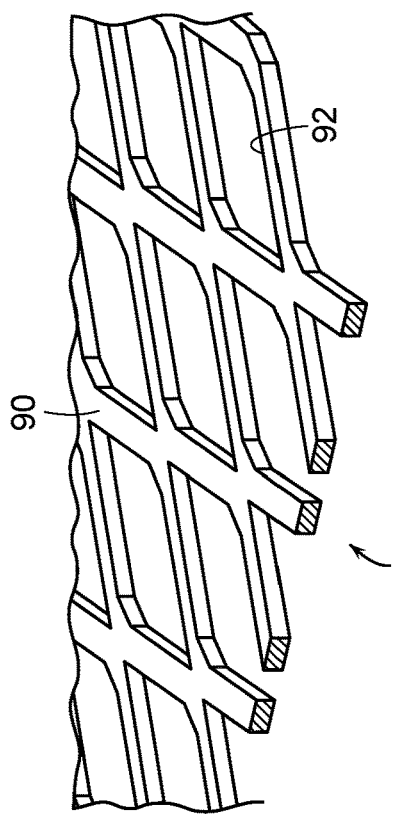
Figure 13D:
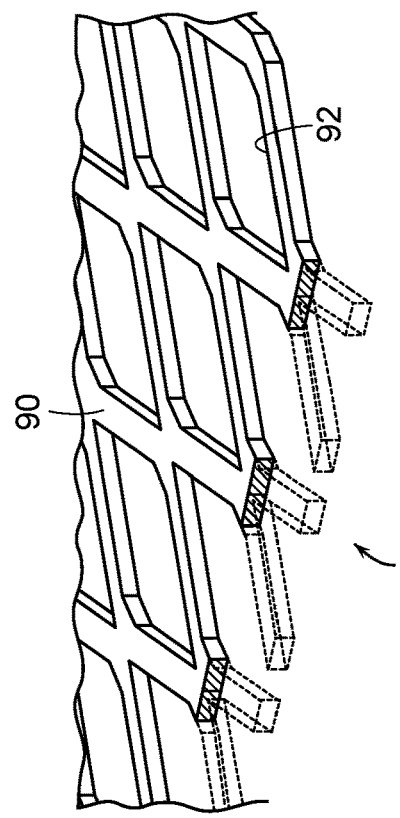

FIG. 11 shows a stamped foil 90 for use in accordance with another embodiment of the present invention that includes stamped openings 92 and an irregular wear edge 94. The opening made be of a variety of shapes, e.g., diamond, square, honeycomb etc., and FIG. 12 shows at 100 a metal component that is formed of two metal layers 102, 104 of FIG. 11, each of which includes openings 106, 108 respectively, and including a leading wear edge 110. During use, the flexible metal layer is held within the laminate, and wears with the laminate. FIGS. 13A-13D show the metal layer 90, by itself for illustrative purposes, with openings 92 and the wear edge 94, wherein, progressing from FIG. 13A-13D, the wear edge 94 becomes worn away, exposing different portions of the wear edge 94.

Figure 14:
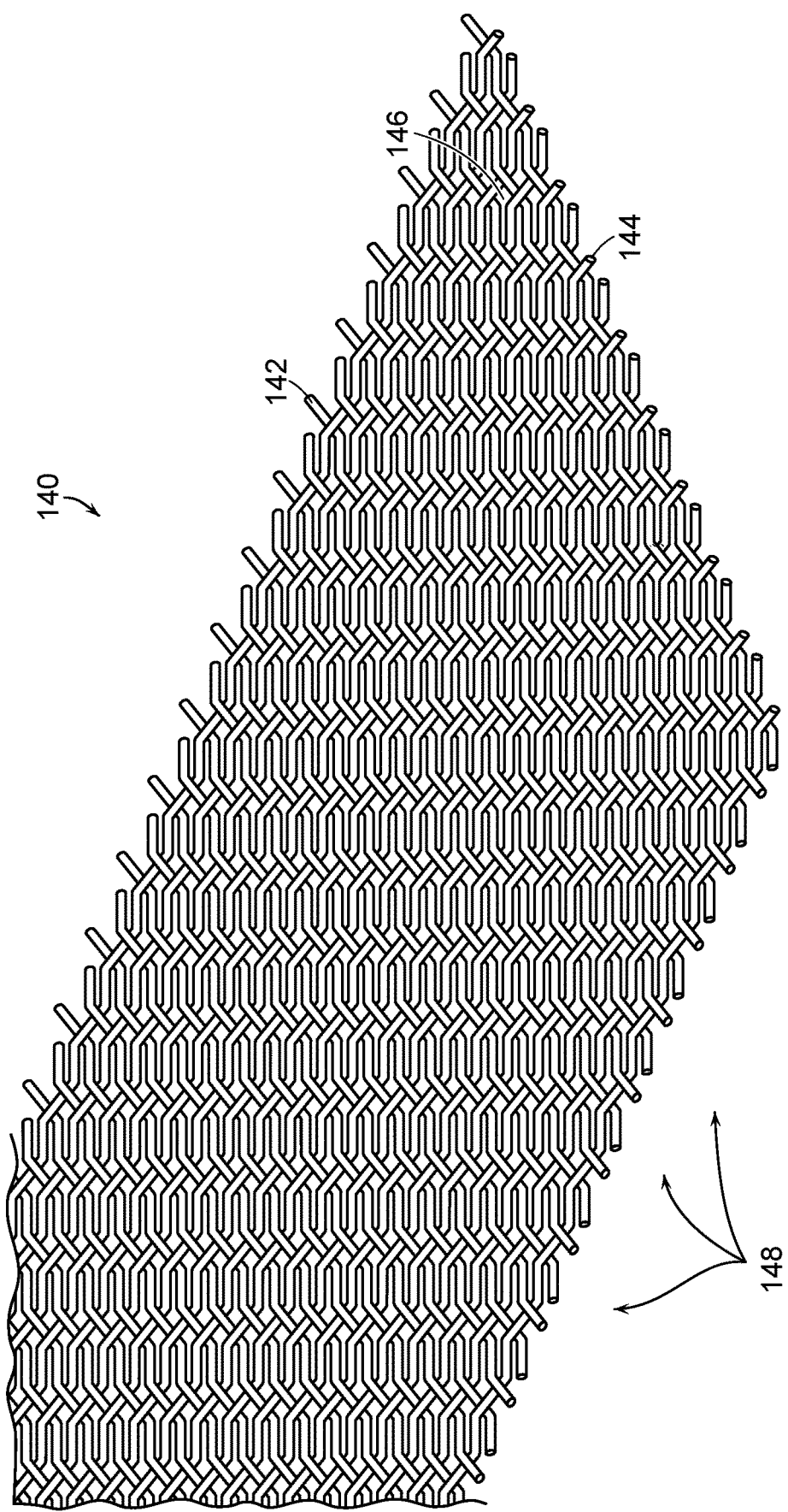
FIG. 14 shows an illustrative diagrammatic isometric view of a doctor blade including a crimp woven metal material in accordance with an embodiment of the present invention.
Figure 15:
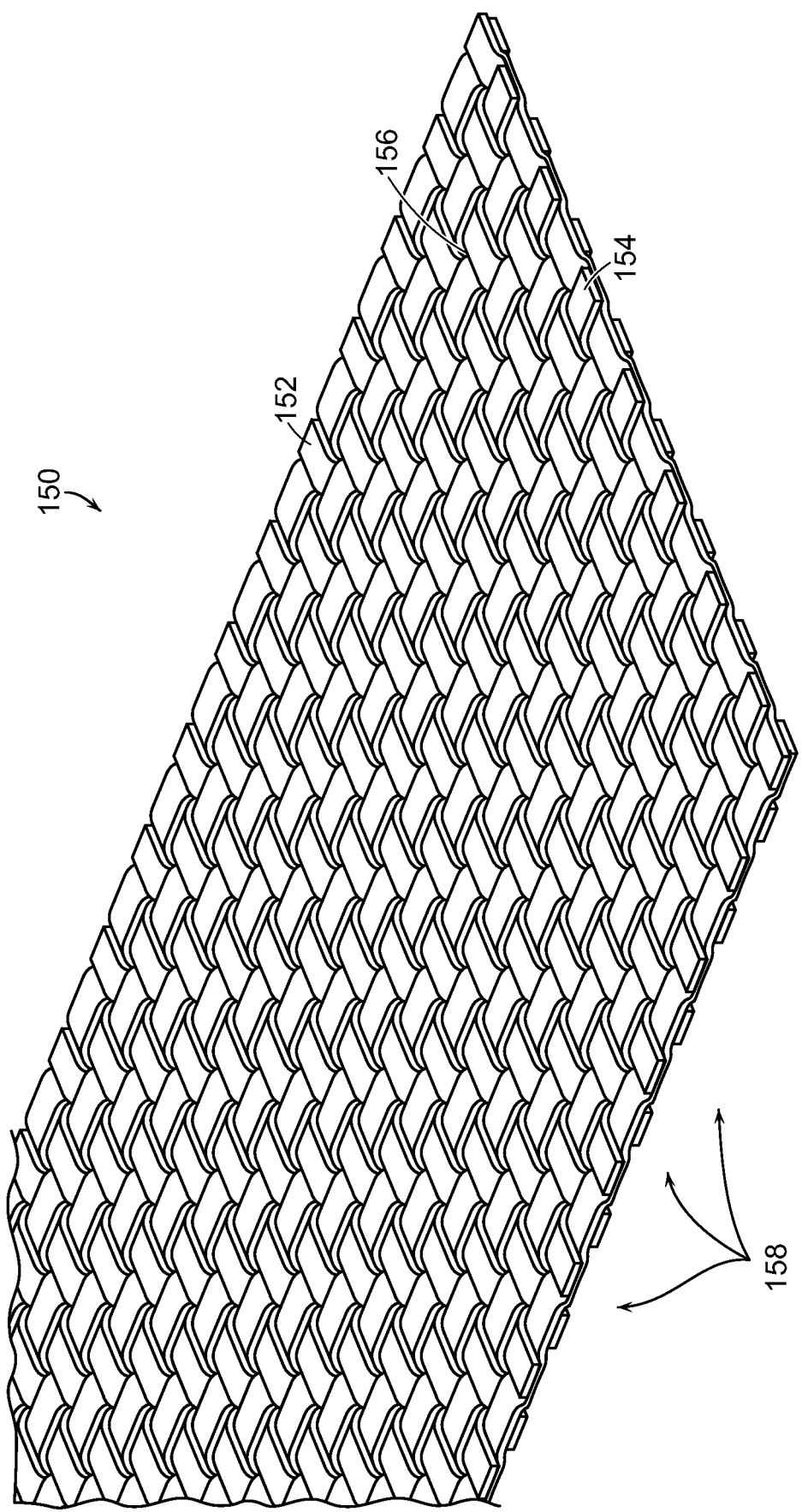
FIG. 15 shows an illustrative diagrammatic isometric view of a doctor blade including a ribbon woven metal material in accordance with an embodiment of the present invention.

With reference to FIG. 14, the flexible metal layer may be provided as a crimp woven material 140 in accordance with another embodiment, in which first strands 142 extend in one direction, and second strands 144 extend in a cross direction, leaving openings 146 between the woven strands. A wear edge 148 provides an irregular surface. In accordance with another embodiment, and with reference to FIG. 15, the flexible metal layer may be provided as a ribbon woven material 150 in accordance with another embodiment, in which first ribbons 152 extend in one direction, and second ribbons 154 extend in a cross direction, leaving openings 156 between the woven ribbons. A wear edge 158 provides an irregular surface.

Figure 16:
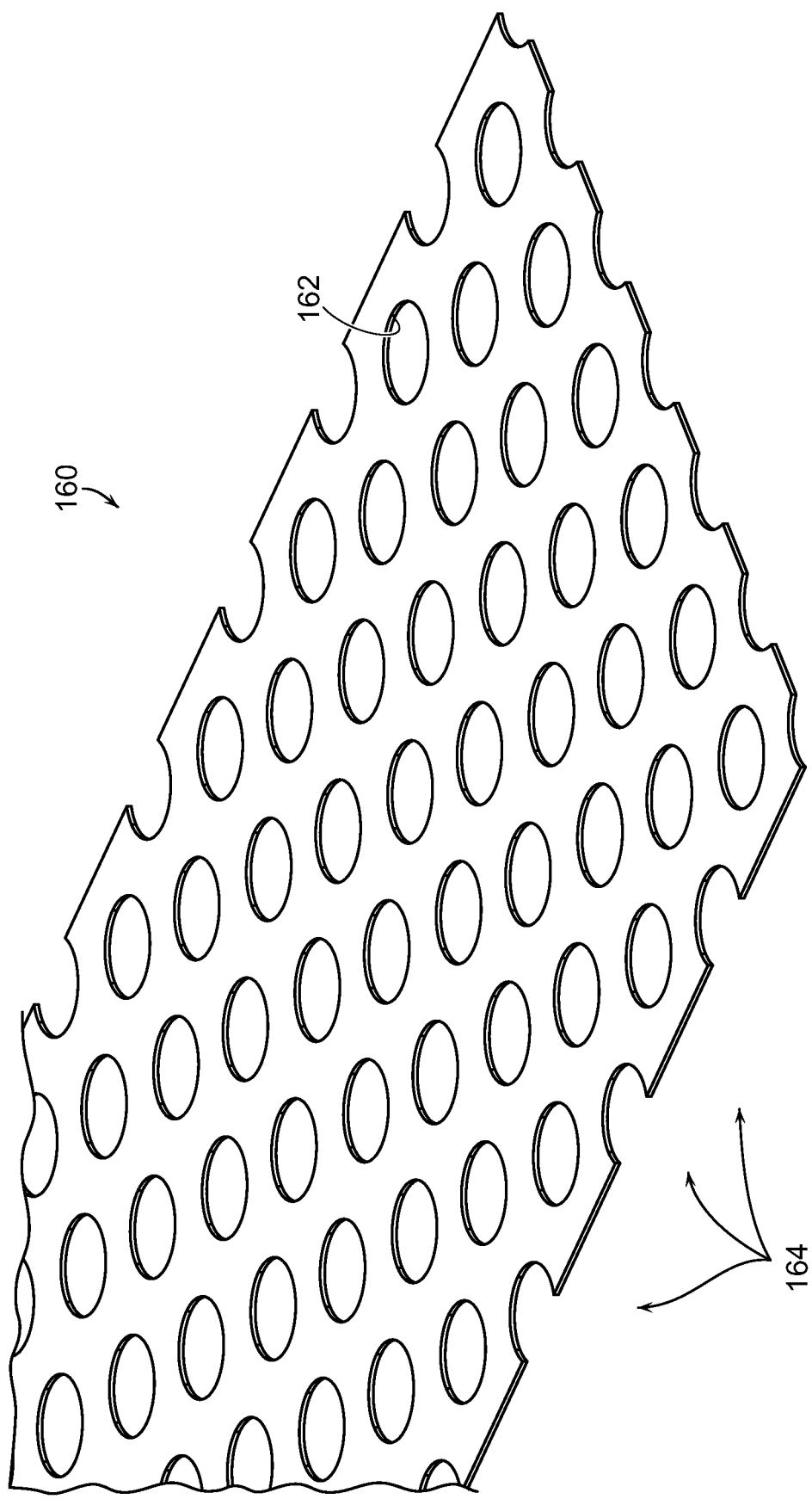
FIG. 16 shows an illustrative diagrammatic isometric view of a doctor blade including a metal material with patterned openings in accordance with an embodiment of the present invention.

FIG. 16 shows a flexible metal layer that is provided as a material 160 with circular stamped openings 162 in accordance with another embodiment, and including an irregular wear edge 164 due to the openings being offset from one another in the cross-machine direction, providing an irregular surface.

Figure 17:
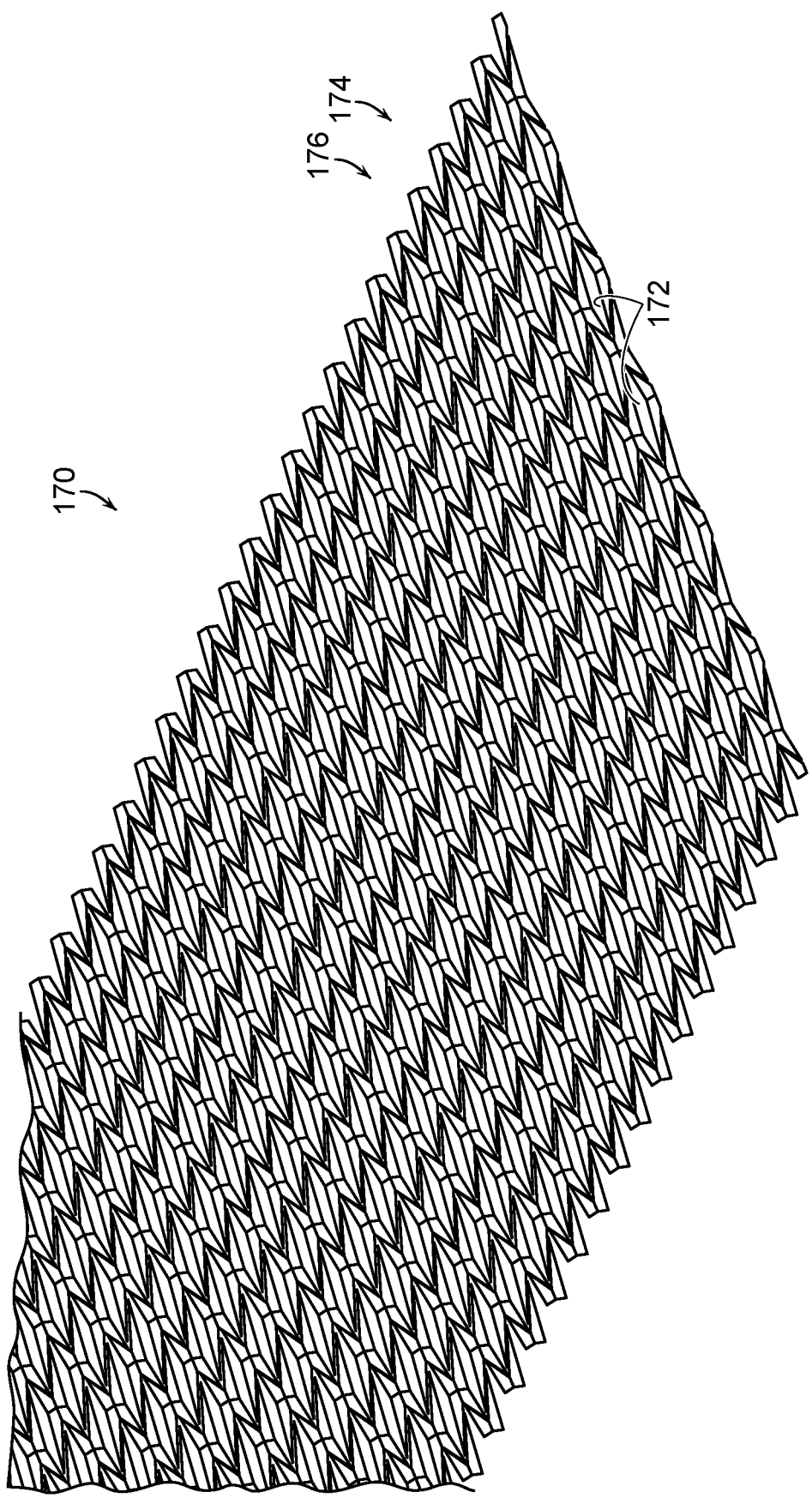
FIG. 17 shows an illustrative diagrammatic isometric view of a doctor blade including a metal foil that is expanded and corrugated in accordance with an embodiment of the present invention.
Figure 18:
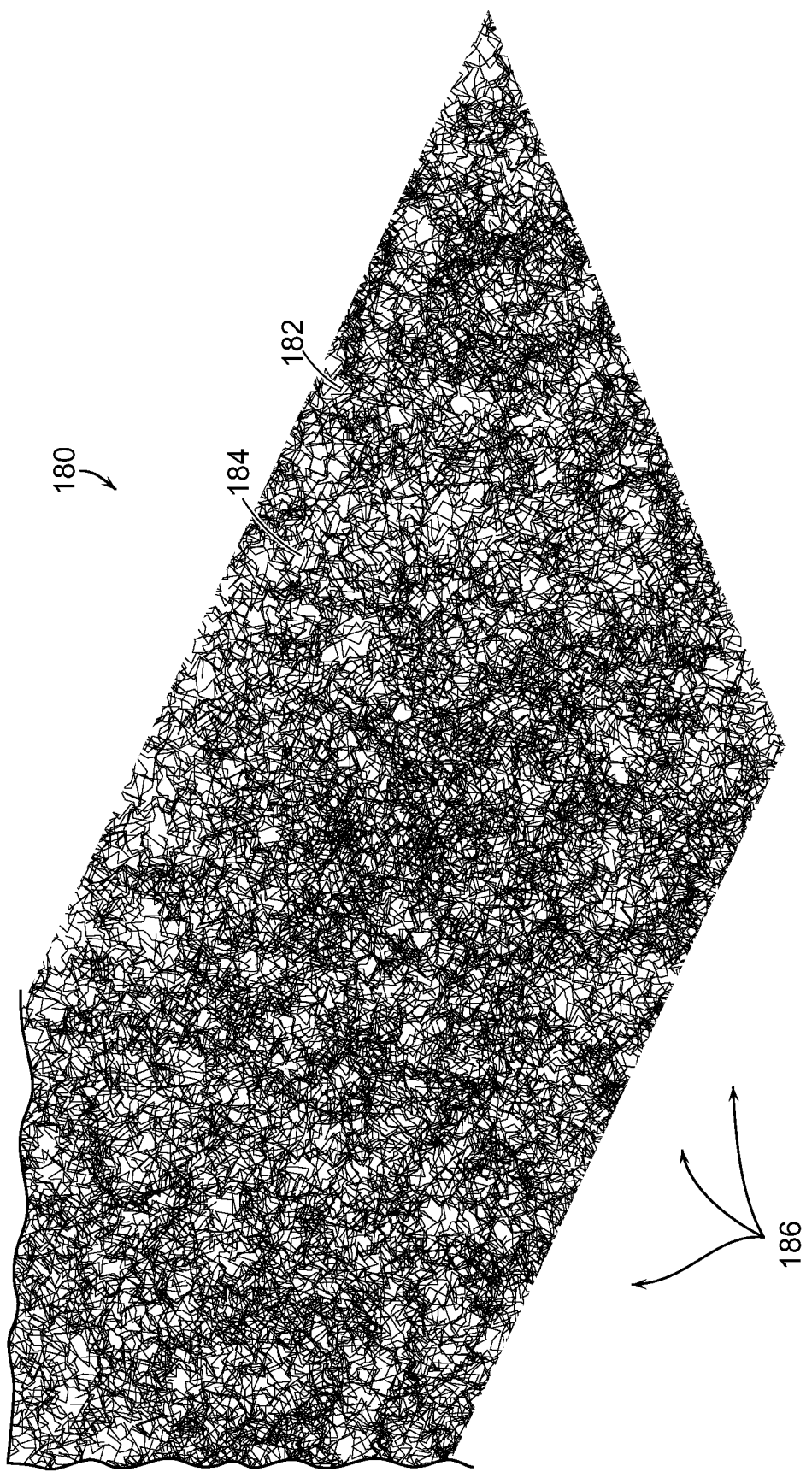
FIG. 18 shows an illustrative diagrammatic isometric view of a doctor blade including a metal material that includes non-patterned metal felt in accordance with an embodiment of the present invention.

FIG. 17 shows a flexible metal layer that is formed of an expanded metal foil 170 that is further corrugated (shaped in the z-direction as discussed above). In particular, the expanded metal foil is formed leaving openings 172 as discussed above with reference to FIG. 8, and is further corrugated such that adjacent portions (as shown at 174, 176) are provided at different places in the z-direction. Again, such variations may facilitate providing good adhesion of the laminate as well as facilitate cleaning of a roll. FIG. 18 shows a flexible metal layer that is provided as a material 180 that is formed on non-patterned metal wire 182 that compressed into a layer, leaving openings 184 in accordance with another embodiment, and including an irregular wear edge 186 due to the irregularity of the compressed wire.

Through extensive trials, results of cleaning rolls using doctor blades made in accordance with certain embodiments of the invention demonstrate unique and advantageous properties, as compared to conventional composite doctor blades. Results of improved cleaning over extended periods of time were both constantly and consistently recorded against traditional composite doctor blades. These results involved applications including dryer cylinders, dryer felt rolls, canvas rolls, and center presses, and the roll covers included ductile iron and cast iron.

In accordance with various embodiments therefore, the invention provides a doctor blade made from a fiber-reinforced composite which also includes a metal mesh or metal filaments. The doctor blade may include glass, carbon, ceramic, or aramid fibers, and may include inorganic fibers, organic fibers, synthetic fibers or modified synthetic fibers. The doctor blade may also include combinations of glass fibers and/or carbon fibers and/or HPT (High performance thermoplastic) fibers and/or aramid fibers in all possible combinations. The resin may be a thermoset resin, e.g. an epoxy resin, or a high performance thermoplastic (HPT) resin, e.g., but not exclusively Polyether ether ketone (PEEK), Polyphenylene sulfide (PPS), Polyether imide (PEI), Polyphthalamide (PPA) or Polyether ketone ketone (PEKK) etc. In accordance with further embodiments, the doctor blade may include nanoparticles, selected from the group consisting of powders, grains, fibers and platelets. The nanoparticles may be metallic and selected from the group consisting of metal oxides, carbides or nitrides, metallic complexes, ionic structures and covalent bonds. The nanoparticles may also be non-metallic and/or covalent and selected from the group consisting of clay particles, silicates, ceramic materials, glass particles, carbon black, fumed silica, calcium carbonate, spherical silica nanoparticles, boron nitride, boron nitride nanotubes, carbon nanotubes, including both multi-walled carbon nanotubes and single walled carbon nanotubes, and nano-spheres of ceramic powders. The nano-spheres may comprise between 0.5% to 75% by weight of the polymeric resin, depending on the type of nanoparticles.

As noted above, the doctor blade may include a metal mesh (e.g., metal foil mesh), made, for example, from Aluminium, Copper, Nickel, Stainless Steel (e.g., 430 grade), Silver, Titanium, Iron, Tin, Zirconium, Beryllium, Magnesium, Lead, Biobium, Kanthal, Carbon steel, Zinc, Brass, Gold, Inconel, Phosphor Bronze or a custom alloy. The expanded mesh may include strand thicknesses in the range of 0.001 inches-0.030 inches/0.03 mm to 0.76 mm. In accordance with further embodiments, more than one layer of mesh material may be incorporated in the composite structure, and the metal fibers may be incorporated with the glass, carbon, ceramic, or aramid fibers.

Those skilled in the art will appreciate that numerous modifications and variations may be made to the above disclosed embodiments without departing from the spirit and scope of the present invention.

What is claimed is:

1. A doctor blade for cleaning a roll surface in a paper-making machine, comprising:
    a top layer, a bottom layer, and a plurality of intermediate layers between the top layer and the bottom layer, wherein each of the top layer, the bottom layer, and the plurality of intermediate layers comprise a structural material; and
    at least one layer of a metal material having a plurality of openings defined therein,
    the at least one layer of the metal material being embedded between the bottom layer and the plurality of intermediate layers of the structural material such that the at least one layer of the metal material is closer to the bottom layer than the top layer, wherein the at least one layer of the metal material includes a leading edge exposed at a beveled edge of the doctor blade that contacts the roll surface for cleaning, and wherein the at least one layer of the metal material comprises stainless steel.

2. The doctor blade as claimed in claim 1, wherein the structural material include fiberglass.

3. The doctor blade as claimed in claim 1, where in the structural material includes carbon fiber.

4. The doctor blade as claimed in claim 1, wherein the metal material is an expanded metal foil.

5. The doctor blade as claimed in claim 1, wherein the metal material is a metal mesh.

6. The doctor blade as claimed in claim 1, wherein the metal material is includes a plurality of woven metal strands, a plurality of woven metal ribbons, or a plurality of metal wires compressed together.

7. The doctor blade as claimed in claim 1, wherein the plurality of openings in the metal material form a pattern of openings.

8. The doctor blade as claimed in claim 7, wherein the metal material includes an expanded foil.

9. The doctor blade as claimed in claim 7, wherein the metal material includes a flattened material.

10. The doctor blade as claimed in claim 7, wherein the metal material includes a crimp weave material.

11. The doctor blade as claimed in claim 7, wherein the metal material includes a woven metal material.

12. The doctor blade as claimed in claim 1, wherein the plurality of openings included in the metal material do not form any pattern.

13. The doctor blade as claimed in claim 1, wherein the plurality of openings included in the metal material do not form any pattern.

14. The doctor blade of claim 1, wherein the structural material includes a resin that penetrates through the plurality of openings in the at least one layer of the metal material to adhere the bottom layer and an adjacent one of the plurality of intermediate layers to each other.

15. The doctor blade as claimed in claim 1, wherein a combined thickness of the top layer and the plurality of intermediate layers is greater than a thickness of the bottom layer.

16. The doctor blade as claimed in claim 1, wherein the at least one layer of metal material is directly bonded with a resin to each of the bottom layer and the plurality of intermediate layers.

17. The doctor blade as claimed in claim 1, wherein the bottom layer extends further than the top layer, the plurality of intermediate layers, and the at least one layer of the metal material to provide the beveled edge of the doctor blade.

18. A doctor blade for cleaning a roll surface in a papermaking machine comprising:
a top layer, a bottom layer, and a plurality of intermediate layers between the top layer and the bottom layer, wherein each of the top layer, the bottom layer, and the plurality of intermediate layers comprises one of a glass fiber material and a carbon fiber material; and
a metal layer having a plurality of openings defined therein,
the metal layer being laminated between the bottom layer and the plurality of intermediate layers such that the metal layer is closer to the bottom layer than the top layer, a portion of the metal layer being exposed at a beveled edge of the doctor blade that contacts a roll surface for cleaning, wherein the exposed portion of the metal layer forms different metal patterns as the beveled edge of the doctor blade wears away, and wherein the metal layer comprises stainless steel.

19. The doctor blade as claimed in claim 18, wherein the metal layer is an expanded metal foil.

20. The doctor blade as claimed in claim 18, wherein the metal material is a metal mesh.

21. The doctor blade as claimed in claim 18, wherein the metal material is includes a plurality of woven metal strands, a plurality of woven metal ribbons, or a plurality of metal wires compressed together.

22. The doctor blade as claimed in claim 18, wherein the plurality of openings in the metal layer form a pattern of openings.

23. The doctor blade as claimed in claim 22, wherein the metal layer includes an expanded foil.

24. The doctor blade as claimed in claim 22, wherein the metal layer includes a flattened material.

25. The doctor blade as claimed in claim 22, wherein the metal layer includes a crimp weave material.

26. The doctor blade of claim 18, wherein the top layer and the bottom layer each includes a resin that penetrates through the plurality of openings in the metal layer to adhere the bottom layer and an adjacent one of the plurality of intermediate layers to each other.

27. The doctor blade as claimed in claim 18, wherein a combined thickness of the top layer and the plurality of intermediate layers is greater than a thickness of the bottom layer.

28. The doctor blade as claimed in claim 18, wherein the metal layer is directly bonded with a resin to each of the bottom layer and the plurality of intermediate layers.

29. The doctor blade as claimed in claim 18, wherein the bottom layer extends further than top layer and the plurality of intermediate layers, and the metal layer to provide the beveled edge of the doctor blade.

* * * * *

UNITED STATES PATENT AND TRADEMARK OFFICE
CERTIFICATE OF CORRECTION

PATENT NO. : 11,459,701 B2
APPLICATION NO. : 16/368167
DATED : October 4, 2022
INVENTOR(S) : Michael Draper et al.

Page 1 of 1

It is certified that error appears in the above-identified patent and that said Letters Patent is hereby corrected as shown below:

In the Claims

In Column 8, Line 34, Claim 6, should read:
"metal material includes a plurality of woven metal strands,"

In Column 9, Line 21, Claim 21, should read:
"metal material includes a plurality of woven metal strands,"

Signed and Sealed this
Eighth Day of November, 2022

Katherine Kelly Vidal
*Director of the United States Patent and Trademark Office*